United States Patent
Huang et al.

(10) Patent No.: US 9,680,158 B2
(45) Date of Patent: Jun. 13, 2017

(54) HIGHLY ACTIVE AND DURABLE FUEL CELL ELECTRO-CATALYST WITH HYBRID SUPPORT

(71) Applicant: THE REGENTS OF THE UNIVERSITY OF CALIFORNIA, Oakland, CA (US)

(72) Inventors: Yu Huang, Los Angeles, CA (US); Yujing Li, Los Angeles, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 29 days.

(21) Appl. No.: 14/397,628

(22) PCT Filed: Apr. 29, 2013

(86) PCT No.: PCT/US2013/038685
§ 371 (c)(1),
(2) Date: Oct. 28, 2014

(87) PCT Pub. No.: WO2014/014543
PCT Pub. Date: Jan. 23, 2014

(65) Prior Publication Data
US 2015/0132684 A1 May 14, 2015

Related U.S. Application Data
(60) Provisional application No. 61/640,446, filed on Apr. 30, 2012.

(51) Int. Cl.
*H01M 4/90* (2006.01)
*H01M 4/92* (2006.01)
(Continued)

(52) U.S. Cl.
CPC .......... *H01M 4/9083* (2013.01); *H01M 4/921* (2013.01); *H01M 4/926* (2013.01);
(Continued)

(58) Field of Classification Search
CPC ....... H01M 2008/1095; H01M 4/8605; H01M 4/9083; H01M 4/921; H01M 4/926
See application file for complete search history.

(56) References Cited

U.S. PATENT DOCUMENTS

| 2012/0214068 A1* | 8/2012 | Dai | H01G 11/36 429/224 |
| 2012/0330044 A1* | 12/2012 | Hou | B82Y 30/00 556/9 |

FOREIGN PATENT DOCUMENTS

| GB | WO 2012114108 A1 * | 8/2012 | H01M 4/9016 |
| JP | 2007-335248 | 12/2007 | |

(Continued)

OTHER PUBLICATIONS

Y. Li, Y. Li, E. Zhu, T. McLouth, C.-Y. Chiu, X. Huang, and Y. Huang. Stabilization of High-Performance Oxygen Reduction Reaction Pt Electrocatalyst Supported on Reduced Graphene Oxide/Carbon Black Composite, J. Am. Chem. Soc. 2012, 134, 12326-12329.*

(Continued)

*Primary Examiner* — Carlos Barcena
(74) *Attorney, Agent, or Firm* — Foley & Lardner LLP; Cliff Z. Liu

(57) ABSTRACT

A fuel cell includes: (1) an anode; (2) a cathode; and (3) an electrolyte disposed between the anode and the cathode. At least one of the anode and the cathode includes an electro-catalyst dispersed on a hybrid support, the hybrid support includes a first, carbon-based support and a second support different from the first, carbon-based support, and a weight percentage of the second support is at least 10% relative to (Continued)

a combined weight of the first, carbon-based support and the second support.

15 Claims, 8 Drawing Sheets

(51) Int. Cl.
    *H01M 4/86*     (2006.01)
    *H01M 8/1018*     (2016.01)

(52) U.S. Cl.
    CPC .. *H01M 4/8605* (2013.01); *H01M 2008/1095* (2013.01); *Y02E 60/50* (2013.01)

(56) References Cited

FOREIGN PATENT DOCUMENTS

| KR | 10-2011-0134712 | * 12/2011 | ............ H01M 4/92 |
|----|-----------------|-----------|------------------------|
| KR | 10-2012-0039992 | * 4/2012  | ............ H01M 4/92 |

OTHER PUBLICATIONS

Si et al., "Exfoliated Graphene Separated by Platinum Nanoparticles", Chem. Mater. 20(21), (2008), pp. 6792-6797.*
Hummers W S et al. (1958), "Preparation of Graphitic Oxide", J. Am. Chem. Soc. 1958, 80: 1339.
International Search Report and Written Opinion for International Application No. PCT/US2013/038685 dated Feb. 25, 2014.
Liang, Y. et al., "Covalent Hybrid of Spinel Manganese-Cobalt Oxide and Graphene as Advanced Oxygen Reduction Electrocatalysts", Journal of the American chemical society, Jan. 23, 2012, vol. 134, pp. 3517-3523.
Stankovich S et al. (2007), "Synthesis of graphene-based nanosheets via chemical reduction of exfoliated graphite oxide", Carbon 2007, 45: 1558-1565.
Choi et al., Synthesis of Surface-Functionalized Graphene Nanosheets With High Pt-Loadings And Their Applications To Methanol Electrooxidation, Carbon, 49(3), (2011), pp. 904-909.
Guo et al., "FePt Nanoparticles Assembled on Graphene as Enhanced Catalyst for Oxygen Reduction Reaction," J. Am. Chem. Soc., 134(5), (2012), pp. 2492-2495.
Guo et al., "Three-Dimensional Pt-on-Pd Bimetallic Nanodendrites Supported on Graphene Nanosheet: Facile Synthesis and Used as an Advanced Nanoelectrocatalyst for Methanol Oxidation," ACS Nano, 4(1), (2010), pp. 547-555.
Kou et al., "Enhanced Activity and Stability of Pt Catalysts on Functionalized Graphene Sheets for Electrocatalytic Oxygen Reduction," Electrochem. Commun., 11(5), (2009), pp. 954-957.
Kou et al., "Stabilization of Electrocatalytic Metal Nanoparticles at Metal-Metal Oxide-Graphene Triple Junction Points," J. Am. Chem. Soc., 133(8), (2011), pp. 2541-2547.
Liang et al., "Co3O4 Nanocrystals On Graphene As A Synergistic Catalyst For Oxygen Reduction Reaction," Nat. Mater. 10, (2011), pp. 780-786.
Rao et al., "Synthesis and Electrocatalytic Oxygen Reduction Activity of Graphene-Supported Pt3Co and Pt3Cr Alloy Nanoparticles," Carbon, 49(3), (2011), pp. 931-936.
Seo et al,. "The Graphene-Supported Pd and Pt Catalysts For Highly Active Oxygen Reduction Reaction In An Alkaline Condition," Electrochem. Commun., 13(2), (2011), pp. 182-185.
Xin et al., "Preparation and Characterization of Pt Supported on Graphene With Enhanced Electrocatalytic Activity In Fuel Cell," J. Power Sources, 196(3), (2011), pp. 1012-1018.
Yoo et al., "Enhanced Electrocatalytic Activity of Pt Subnanoclusters on Graphene Nanosheet Surface," Nano Lett. 9(6), (2009), pp. 2255-2259.
Yoo et al., "Sub-nano-Pt Cluster Supported on Graphene Nanosheets for Co Tolerant Catalysts In Polymer Electrolyte Fuel Cells," J. Power Sources, 196(1), (2011), pp. 110-115.

* cited by examiner

HIGHLY ACTIVE AND DURABLE FUEL CELL ELECTRO-CATALYST WITH HYBRID SUPPORT

CROSS-REFERENCE TO RELATED APPLICATION

This application is a National Stage Entry of PCT/US2013/038685 filed on Apr. 29, 2013, which claims the benefit of U.S. Provisional Application No. 61/640,446 filed on Apr. 30, 2012, the disclosure of which is incorporated herein by reference in its entirety.

STATEMENT REGARDING FEDERALLY SPONSORED RESEARCH OR DEVELOPMENT

This invention was made with Government support under Grant No. W911NF-09-1-0433, awarded by the U.S. Army, Army Research Office. The Government has certain rights in the invention.

FIELD OF THE INVENTION

The invention generally relates to electro-catalysts and, more particularly, electro-catalysts with hybrid supports.

BACKGROUND

Precious metal nanocrystals are typically loaded on carbon-based materials for heterogeneous and electrochemical catalysis. For example, high surface area carbon black, carbon nanotubes, and highly oriented pyrolytic graphite have been investigated as catalyst supports for the oxygen reduction reaction occurring at a fuel cell cathode. Despite progress made to date, the activity and durability of carbon-supported catalysts remain issues of concern to both industry and academia.

It is against this background that a need arose to develop the electro-catalysts with hybrid supports described herein.

SUMMARY

One aspect of this disclosure relates to a fuel cell. In one embodiment, the fuel cell includes: (1) an anode; (2) a cathode; and (3) an electrolyte disposed between the anode and the cathode. At least one of the anode and the cathode includes an electro-catalyst dispersed on a hybrid support, the hybrid support includes a first, carbon-based support and a second support different from the first, carbon-based support, and a weight percentage of the second support is at least 10% relative to a combined weight of the first, carbon-based support and the second support. The first, carbon-based support can include, for example, sheets of reduced graphene oxide, and the second support can include, for example, carbon black particles that are disposed between the sheets of reduced graphene oxide.

Another aspect of this disclosure relates to an electrode for a fuel cell. In one embodiment, the electrode includes: (1) a hybrid support; and (2) an electro-catalyst dispersed on the hybrid support. The hybrid support includes a primary support of reduced graphene oxide and a secondary support of a carbon-based material different from reduced graphene oxide, and a weight ratio of the secondary support to the primary support is in the range of 3:7 to 7:3.

A further aspect of this disclosure relates to a manufacturing method of an electrode for a fuel cell. In one embodiment, the method includes: (1) combining an electro-catalyst with a primary support to form an electro-catalyst-loaded primary support; and (2) combining the electro-catalyst-loaded primary support with a secondary support to form a composite of the electro-catalyst, the primary support, and the secondary support. One of the primary support and the secondary support includes reduced graphene oxide, and another one of the primary support and the secondary support includes a support material different from reduced graphene oxide.

Other aspects and embodiments of this disclosure are also contemplated. The foregoing summary and the following detailed description are not meant to restrict this disclosure to any particular embodiment but are merely meant to describe some embodiments of this disclosure.

BRIEF DESCRIPTION OF THE DRAWINGS

For a better understanding of the nature and objects of some embodiments of this disclosure, reference should be made to the following detailed description taken in conjunction with the accompanying drawings.

(d,e) TEM images and (f) histogram of statistical analysis of Pt particle size of Pt/RGO collected from an electrode after ADT.

Figure 11:
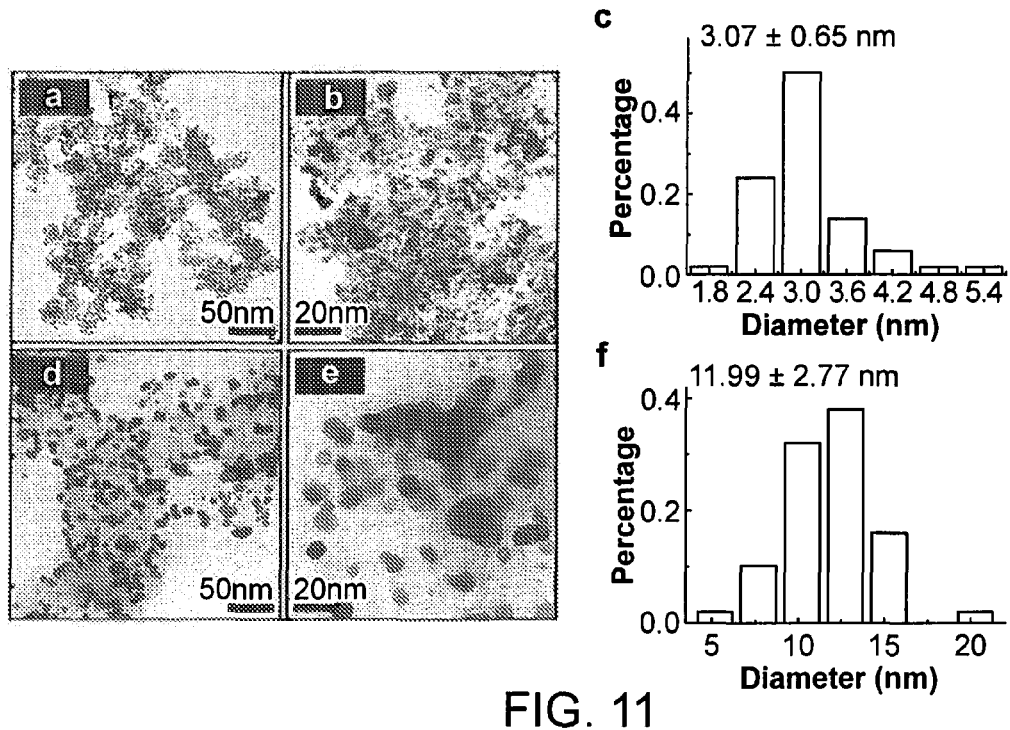

FIG. 11: JM Pt/C catalyst (a,b) before and (d,e) after ADT. (c) and (f) are histograms of statistical analysis of Pt particle size of JM Pt/C before and after ADT.

Figure 12:
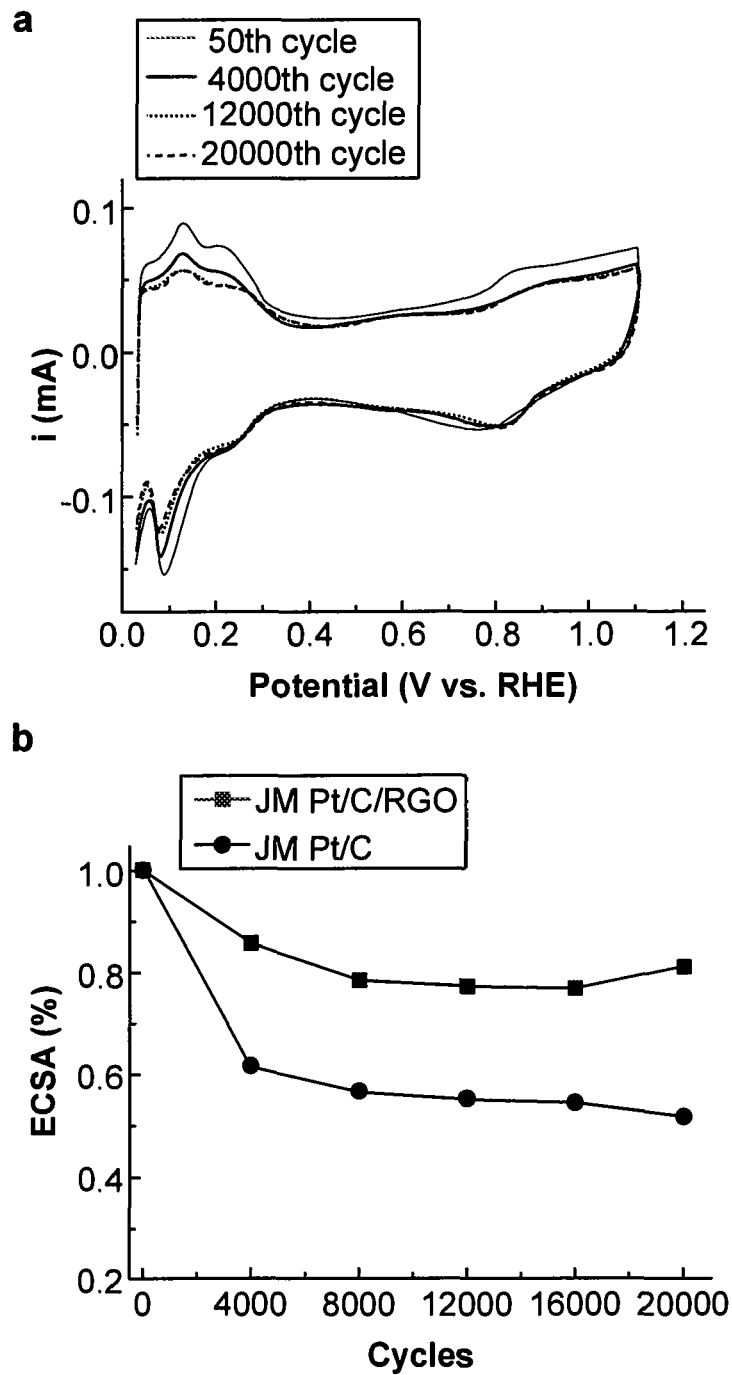

FIG. 12: (a) CV curves after 50, 4,000, 12,000, and 20,000 cycles for JM Pt/C/RGO catalyst. (b) Change of ECSA with ADT cycles, compared with JM Pt/C catalyst.

DETAILED DESCRIPTION

Definitions

The following definitions apply to some of the aspects described with respect to some embodiments of this disclosure. These definitions may likewise be expanded upon herein.

As used herein, the singular terms "a," "an," and "the" include plural referents unless the context clearly dictates otherwise. Thus, for example, reference to an object can include multiple objects unless the context clearly dictates otherwise.

As used herein, the terms "substantially" and "substantial" refer to a considerable degree or extent. When used in conjunction with an event or circumstance, the terms can refer to instances in which the event or circumstance occurs precisely as well as instances in which the event or circumstance occurs to a close approximation, such as accounting for typical tolerance levels or variability of the embodiments described herein.

As used herein, the term "size" refers to a characteristic dimension of an object. Thus, for example, a size of an object that is spherical can refer to a diameter of the object. In the case of an object that is non-spherical, a size of the non-spherical object can refer to a diameter of a corresponding spherical object, where the corresponding spherical object exhibits or has a particular set of derivable or measurable characteristics that are substantially the same as those of the non-spherical object. Thus, for example, a size of a non-spherical object can refer to a diameter of a corresponding spherical object that exhibits light scattering characteristics that are substantially the same as those of the non-spherical object. Alternatively, or in conjunction, a size of a non-spherical object can refer to an average of various orthogonal dimensions of the object. Thus, for example, a size of an object that is a spheroidal can refer to an average of a major axis and a minor axis of the object. When referring to a set of objects as having a particular size, it is contemplated that the objects can have a distribution of sizes around the particular size. Thus, as used herein, a size of a set of objects can refer to a typical size of a distribution of sizes, such as an average size, a median size, or a peak size.

Electro-catalysts with Hybrid Supports

Embodiments of this disclosure are directed to the use of graphene, or reduced graphene oxide, as a two-dimensional material with high electrical conductivity, high surface area, and high mechanical strength, all of which are desirable properties for an electro-catalyst support. Graphene oxide is a compound of carbon, oxygen, and hydrogen in adjustable ratios, and can be formed as flakes or sheets, such as in monolayer or multilayer form. Reduced graphene oxide can be formed by at least partially reducing graphene oxide, such as by treating suspended graphene oxide with hydrazine at elevated temperatures (e.g., about 100° C. for about 24 hours) or by exposing graphene oxide to hydrogen plasma or a strong pulse of light. For example, reduced graphene oxide can be formed by hydrazine reduction of graphene oxide formed according to Hummer's method as set forth in Hummers, W. S. et al., *J. Am. Chem. Soc.* 1958, 80, 1339; and Stankovich, S. et al., *Carbon* 2007, 45, 1558-65, the disclosures of which are incorporated herein by reference their entirety.

However, due to the nature of the two-dimensional material, reduced graphene oxide sheets tend to stack together through π-π interactions when the sheets are dried, even when the sheets are loaded with precious metal nanocrystals. This stacking can block substantial amount of catalytic sites on nanocrystals, and can set higher resistance for the diffusion of reactant molecules, which retards a catalytic reaction.

To address these challenges, embodiments of this disclosure demonstrate an innovative approach to designing electro-catalysts for fuel cells. The approach employs a hybrid support including at least two different types of support materials, which as a combination can dramatically and synergistically increase a lifetime of an electro-catalyst as well as its activity. The catalyst design approach can be used as a general approach and applied to both cathode and anode catalysts in various types of fuel cells.

In some embodiments, a hybrid support includes a combination or mixture of reduced graphene oxide as a first or primary support to which a majority or more (by weight or number) of electro-catalyst nanocrystals are initially attached, and at least one additional support material as a second or secondary support. Other sheet-like materials are also contemplated as suitable for the primary support, such as graphene. The secondary support can include a carbon-based material other than reduced graphene oxide, such as high surface area carbon black, carbon nanotubes, and highly oriented pyrolytic graphite, although non-carbon-based materials are also contemplated as suitable for the secondary support. For example, carbon black, when used as the secondary support, can be included as particles having generally spheroidal shapes or other shapes having an aspect ratio of about 5 or less, and having particle sizes in the range of about 10 nm to about 400 nm, such as from about 20 nm to about 100 nm, from about 100 nm to about 200 nm, or from about 250 nm to about 350 nm.

By way of example, an oxygen reduction reaction catalyst can be implemented by supporting precious metal nanocrystals with a primary support of reduced graphene oxide, along with a secondary support of carbon black. By inserting carbon black particles between reduced graphene oxide sheets, the stacking of reduced graphene oxide can be effectively mitigated, thereby promoting the diffusion of oxygen molecules through the reduced graphene oxide sheets and enhancing an electro-catalytic activity in oxygen reduction reaction. In addition, the hybrid support can dramatically enhance the durability of the catalyst and retain an electrochemical surface area of the precious metal, such as by weakening the Ostwald ripening of precious metal nanocrystals and reducing the loss of precious metal atoms.

In some embodiments, selection of support materials for a hybrid support can be based on one or both of the following considerations: 1. Electro-catalyst should be substantially uniformly dispersed on a primary support; and 2. Electrical conductivity of both primary and secondary supports should be of sufficient levels. Also, amounts of a primary support and a secondary support can be adjusted to tune performance in terms of catalytic activity and durability. In some embodiments, a content of the secondary support can be at least about 5%, expressed as a weight percentage (or wt %) of the secondary support relative to a combined weight of the primary and secondary supports, such as at least about 10%, at least about 20%, at least about 30%, at least about 40%, at least about 50%, at least about 60%, or at least about 70%, and up to about 80%, up to about 90%, or up to about 95%. A weight ratio of the secondary support to the primary support can be at least about 1:19, such as at least about 1:9, at least about 1:4, at least about 3:7, at least about 2:3, at least about 1:1, at least about 3:2, or at least about 7:3, and up to about 4:1, up to about 9:1, or up to about 19:1. In some embodiments, the weight ratio of the secondary support to the primary support can be in the range of about 3:7 to about 7:3, such as from about 2:3 to about 3:2 or from about 9/11 to about 11/9.

Examples of suitable electro-catalysts that can be loaded on, supported by, or otherwise incorporated into a hybrid support include precious metals, such as platinum, rhodium, gold, iridium, osmium, palladium, rhenium, ruthenium, and silver, as well as combinations or alloys of such precious metals, optionally with non-precious metals such as nickel. A precious metal, when used as the electro-catalyst, can be included as nanocrystals having a cuboctahedral morphology or other shapes having an aspect ratio of about 5 or less, and having particle sizes in the range of about 1 nm to about 100 nm, such as from about 1 nm to about 50 nm, from about 1 nm to about 20 nm, from about 1 nm to about 15 nm, or from about 1 nm to about 10 nm. Nanocrystals of an electro-catalyst can be substantially monodisperse in sizes (at least when initially loaded on a hybrid support), exhibiting a standard deviation of no greater than about 20% relative an average size, such as no greater than about 15%, no greater than about 10%, or no greater than about 5%. In some embodiments, a loading of an electro-catalyst in a hybrid support can be at least about 5%, expressed as a weight percentage of the electro-catalyst relative to a combined weight of the electro-catalyst and the hybrid support, such as at least about 10%, at least about 15%, at least about 20%, at least about 25%, at least about 30%, or at least about 35%, and up to about 40%, up to about 45%, or up to about 50%. In some embodiments, the loading of the electro-catalyst in the hybrid support can be in the range of about 15% to about 45%, such as from about 20% to about 40%, from about 20% to about 35%, or from about 20% to about 30%.

For implementation within a fuel cell, an electro-catalyst can be initially combined with a primary support to load the electro-catalyst on the primary support, and the electro-catalyst-loaded primary support can be combined with a secondary support to form a composite of electro-catalyst/primary support/secondary support. The order of combining the electro-catalyst, the primary support, and the secondary support can be varied for other implementations. For example, the primary support can be initially combined with the secondary support to form a hybrid support, and the electro-catalyst can be loaded on the hybrid support. As another example, the electro-catalyst can be initially combined with the secondary support to load the electro-catalyst on the secondary support, and the electro-catalyst-loaded secondary support can be combined with the primary support to form a composite of electro-catalyst/primary support/secondary support. The resulting composite can be deposited on a substrate, dried to form a coating, a film, or other layer on the substrate, and then assembled as an electrode along with other components of the fuel cell.

Electro-catalysts with hybrid supports described herein can exhibit a number of desirable properties for use as electrode materials within fuel cells, including high catalytic activity and high durability.

For example, in terms of catalytic activity, electro-catalysts with hybrid supports can have a specific activity (e.g., an initial or maximum specific activity or an average specific activity over a particular number of cycles under cycling conditions, such as cycles 1 through 100 or cycles 1 through 1,000) that is at least about 0.16 mA/cm$^2$, at least about 0.18 mA/cm$^2$, at least about 0.2 mA/cm$^2$, at least about 0.22 mA/cm$^2$, at least about 0.24 mA/cm$^2$, at least about 0.26 mA/cm$^2$, or at least about 0.28 mA/cm$^2$, and up to about 0.3 mA/cm$^2$ or more. Also, in terms of catalytic activity, electro-catalysts with hybrid supports can have a mass activity (e.g., an initial or maximum mass activity or an average mass activity over a particular number of cycles under cycling conditions, such as cycles 1 through 100 or cycles 1 through 1,000) that is at least about 0.08 A/mg, at least about 0.1 A/mg, at least about 0.12 A/mg, at least about 0.14 A/mg, at least about 0.16 A/mg, or at least about 0.18 A/mg, and up to about 0.2 A/mg or more. Also, in terms of catalytic activity, electro-catalysts with hybrid supports can have a specific electrochemical surface area (e.g., an initial or maximum surface area or an average surface area over a particular number of cycles under cycling conditions, such as cycles 1 through 100 or cycles 1 through 1,000) that is at least about 46 m$^2$/g, at least about 48 m$^2$/g, at least about 50 m$^2$/g, at least about 52 m$^2$/g, at least about 54 m$^2$/g, at least about 56 m$^2$/g, or at least about 58 m$^2$/g, and up to about 62 m$^2$/g or more.

As another example, electro-catalysts with hybrid supports can exhibit excellent retention of specific activity under cycling conditions, such that, after 20,000 cycles, at least about 60%, at least about 65%, at least about 70%, or at least about 75%, and up to about 80%, up to about 85%, or more of an initial or maximum specific activity is retained. Also, electro-catalysts with hybrid supports can exhibit excellent retention of mass activity under cycling conditions, such that, after 20,000 cycles, at least about 55%, at least about 60%, at least about 65%, or at least about 70%, and up to about 75%, up to about 80%, or more of an initial or maximum mass activity is retained. Also, electro-catalysts with hybrid supports can exhibit excellent retention of electrochemical surface area under cycling conditions, such that, after 20,000 cycles, at least about 70%, at least about 75%, at least about 80%, at least about 85%, at least about 90%, or at least about 95%, and up to about 97%, up to about 98%, or more of an initial or maximum electrochemical surface area is retained.

Applications of Electro-catalysts with Hybrid Supports

The electro-catalysts with hybrid supports described herein can be used for a variety of fuel cells that convert chemical energy from a fuel into electricity through a chemical reaction with oxygen or another oxidizing agent. For example, the electro-catalysts with hybrid supports can be substituted in place of, or used in conjunction with, conventional electrode materials for fuel cells, such as proton exchange membrane fuel cells, alkaline fuel cells, phosphoric acid fuel cells, solid oxide fuel cells, molten carbonate fuel cells, direct methanol fuel cells, zinc air fuel cells, protonic ceramic fuel cells, biological fuel cells, direct borohydride fuel cells, metal hydride fuel cells, formic acid fuel cells, and direct ethanol fuel cells.

Figure 1:
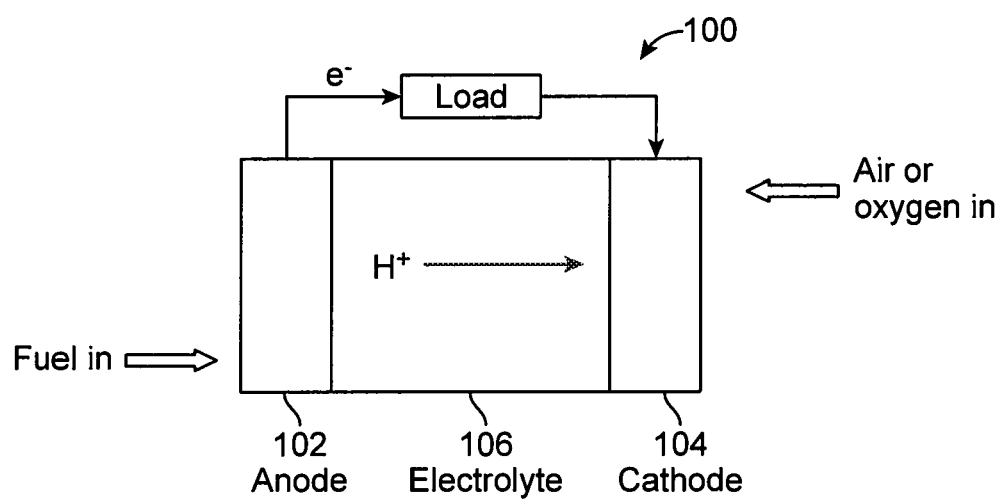
FIG. 1: Schematic of a fuel cell incorporating an electro-catalyst with a hybrid support.

FIG. 1 illustrates a fuel cell 100 implemented in accordance with an embodiment of the invention. The fuel cell 100 includes an anode (or negative electrode) 102, a cathode (or positive electrode) 104, and an electrolyte 106 that is disposed between the anode 102 and the cathode 104. In the illustrated embodiment, the fuel cell 100 is a proton exchange membrane fuel cell, in which the electrolyte 106 is implemented as a proton exchange membrane, such as one formed of a fluorinated Teflon-based material or other suitable fluorinated polymer. During operation of the fuel cell 100, hydrogen (as a fuel) is oxidized at the anode 102, and oxygen is reduced at the cathode 104. Protons are transported from the anode 102 to the cathode 104 through the electrolyte 106, and electrons are transported over an external circuit load. At the cathode 104, oxygen reacts with the protons and the electrons, forming water and producing heat.

In the illustrated embodiment, either one, or both, of the anode 102 and the cathode 104 can be formed of an electro-catalyst with a hybrid support. For example, the anode 102 can be formed as a film of a first precious metal catalyst and a first hybrid support, and the cathode 104 can be formed as a film of a second precious metal catalyst and a second hybrid support. In this example, the first precious metal catalyst and the second precious metal catalyst can be the same or different, and the first hybrid support and the second hybrid support can be the same or different.

EXAMPLE

The following example describes specific aspects of some embodiments of this disclosure to illustrate and provide a description for those of ordinary skill in the art. The example should not be construed as limiting this disclosure, as the example merely provides specific methodology useful in understanding and practicing some embodiments of this disclosure.

Stabilization of High Performance Platinum Electro-catalyst Supported on Reduced Graphene Oxide by Insertion of High Surface Area Carbon Black for Oxygen Reduction Reaction This example demonstrates the preparation of oxygen reduction reaction ("ORR") catalyst supported with hybrid materials by inserting carbon black ("CB") into Platinum ("Pt")-loaded reduced graphene oxide ("RGO"). With the insertion of CB particles between RGO sheets, the stacking of RGO can be effectively mitigated, which promotes the diffusion of oxygen molecules through the RGO sheets and enhances the electro-catalytic activity in ORR. In addition, accelerated durability test ("ADT") demonstrates that the hybrid support can dramatically enhance the durability of the catalyst and retain the electrochemical surface area ("ECSA") of Pt, by weakening the Ostwald ripening of Pt nanocrystals ("NCs") and reducing the loss of Pt atoms. The final ECSA after 20,000 ADT cycles can be retained at a level higher than about 95%, much higher than a commercially available catalyst.

Specifically, this example demonstrates an approach to design highly active and durable ORR catalyst by loading Pt NCs on a primary support of RGO and then mixing with a secondary support of high surface area CB. By inserting CB particles between the Pt/RGO sheets, the composite structure enhanced the catalytic activity, as well as dramatically improved the durability of the catalyst.

Figure 7:
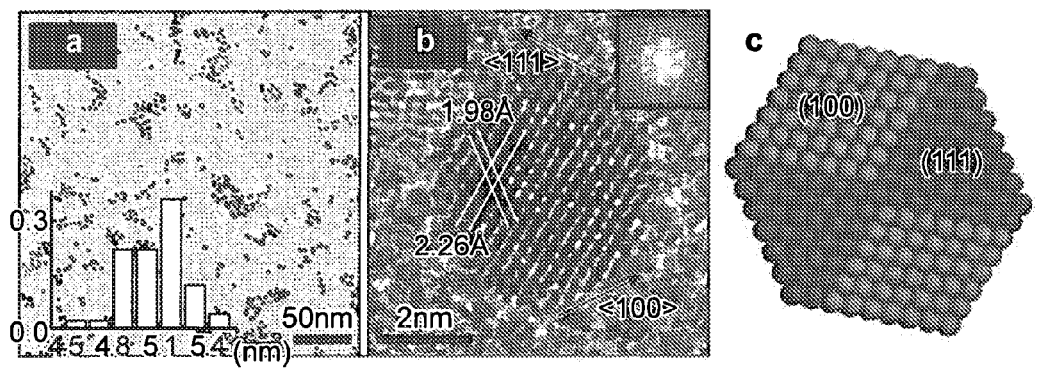
FIG. 7: (a) TEM image of as-synthesized Pt NCs. Inset: Statistical analysis of sizes based on 100 randomly picked NCs. (b) High resolution TEM image showing the lattice of a Pt NC. Inset: Fast Fourier transform from the <110> zone axis. (c) Schematic of a constructed cuboctahedral NC with (100) and (111) facets highlighted.

Pt NCs were synthesized in aqueous solution at about 85° C. (See Method Section below for experimental details). A transmission electron microscope ("TEM") image of the as-synthesized water-soluble Pt NCs is shown in FIG. 7. Over about 80% of the NCs show cuboctahedral morphology with substantially uniform size. The average size is about 5 nm with a deviation lower than about 5%. The high resolution image in FIG. 7(b) shows that the as-synthesized Pt NCs are single crystalline.

Figure 2:
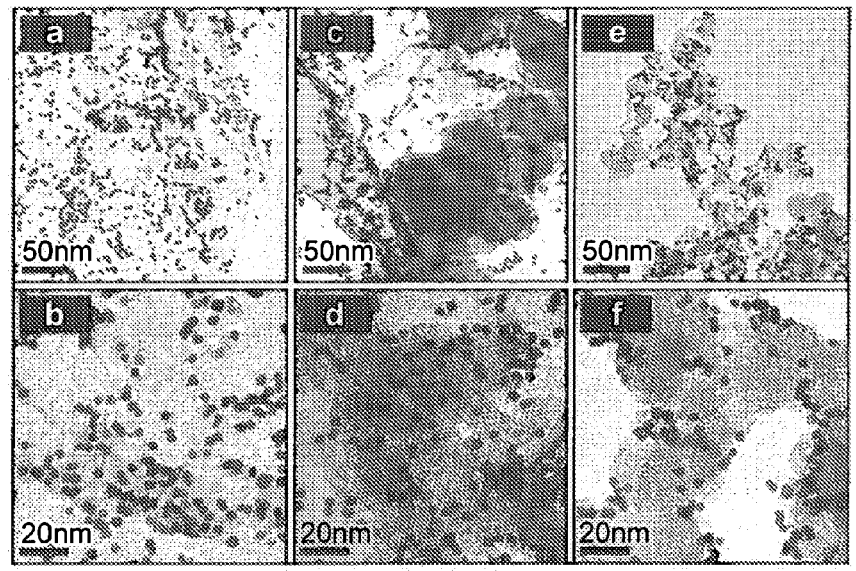
FIG. 2: Transmission electron microscope ("TEM") images of (a,b) Platinum ("Pt") nanocrystals ("NCs") loaded on reduced graphene oxide ("RGO"), (c,d) Pt/RGO mixed with carbon black ("CB") (Pt/RGO/CB-1), and (e,f) Pt NCs loaded on CB alone.

After reaction was completed, a weight concentration of the Pt NCs in solution was measured by inductively coupled plasma optical emission spectrometry ("ICP-OES") to determine the amount of carbon-based materials to achieve an expected Pt/carbon ratio. Pt NCs loaded on different types of supports are shown in FIG. 2. On RGO, the Pt loading ratio is about 33 wt % (based on total weight). The TEM image shows that Pt NCs were loaded substantially uniformly on RGO without noticeable localized aggregation. RGO was obtained by hydrazine reduction of graphene oxide synthesized by Hummer's method. The RGO sheets were not entirely monolayer graphene in this example, but contained some portions of multilayer graphene. Pt/RGO/CB composite was prepared by mixing Pt/RGO with CB and stirring overnight. According to FIG. 2(c), which is a typical view under TEM, Pt-loaded RGO sheets form composites with CB particles, with physical contact between CB and RGO. Besides, most Pt NCs were still attached on RGO, instead of CB, indicating firm contact between Pt NCs and the RGO. As a comparison, TEM images of Pt NCs directly loaded on CB are shown in FIG. 2(e,f). It can be seen that there is a distinctive difference in how Pt NCs are located on Pt/CB from that of Pt NCs in the Pt/RGO/CB sample. Two types of Pt/RGO/CB catalysts were prepared with RGO/CB weight ratio of about 1/1 (termed as Pt/RGO/CB-1) and about 2/1 (Pt/RGO/CB-2). The loading ratio of Pt on Pt/RGO/CB-1 shown in FIG. 2(c,d) is about 22 wt %, Pt on Pt/RGO/CB-2 is about 26 wt %, and Pt on custom-made HM Pt/CB is about 21 wt %, as determined by thermal gravimetric analysis (TGA).

Figure 3:
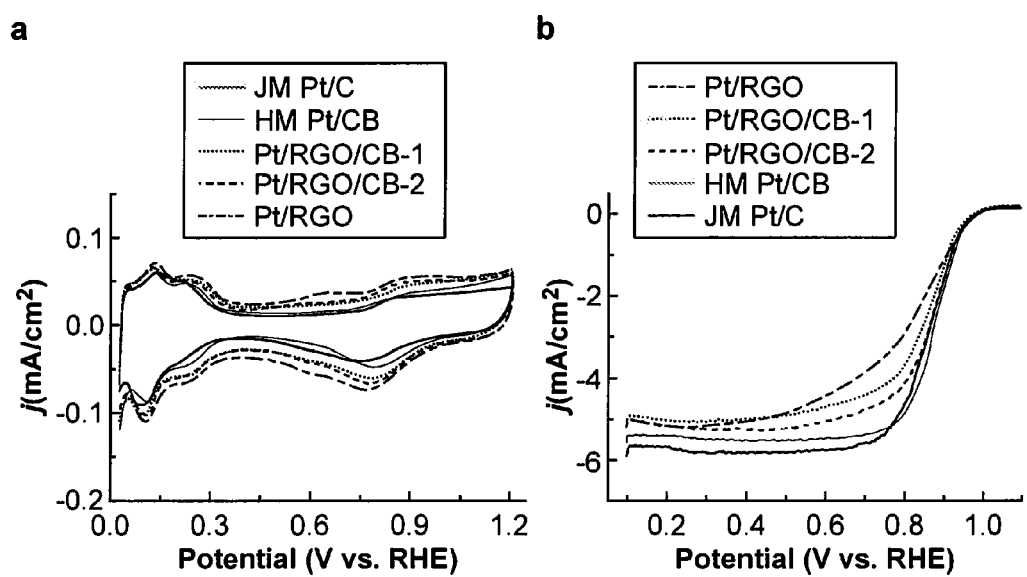
FIG. 3: (a) Cyclic voltammetry ("CV") curves, and (b) polarization curves for custom-made HM Pt/CB, Pt/RGO, commercially available JM Pt/C, and two samples of Pt/RGO mixed with CB, labeled Pt/RGO/CB-1 and Pt/RGO/CB-2.

Electrochemical measurement was carried out to observe the effect of CB insertion on ORR. The loading of Pt on glassy carbon electrode ("GCE") was controlled at about 13.8 µg/cm$^2$ for all catalyst samples with custom-made Pt NCs. Due to the difficulty of making a uniform catalyst film with commercially available JM Pt/C at the same loading level, the loading of the baseline catalyst JM Pt/C was controlled at about 20.4 µg/cm$^2$. After the electrode was substantially fully activated with cyclic voltammetry ("CV") scans between about 0 and about 1.0 V (vs. reversible hydrogen electrode ("RHE")), stable CV curves were recorded and compared as shown in FIG. 3(a). All CV curves were normalized by corresponding ECSAs calculated by integrating hydrogen adsorption charges. The specific ECSAs of these catalysts were measured to be about 60.1, about 57.0, about 56.4, and about 50.0 m$^2$/g for HM Pt/CB, Pt/RGO, Pt/RGO/CB-1, and Pt/RGO/CB-2, compared with about 58.9 m$^2$/g for JM Pt/C. It can be inferred from the CV curves that the double layer charging capacitances of RGO-supported catalysts were higher than CB-supported catalysts.

Polarization curves in O$_2$-saturated HClO$_4$ electrolyte were recorded on rotating disk electrode ("RDE") at a rotating rate of about 1,600 rpm, normalized with area of the GCE (about 0.196 cm$^2$), as shown in FIG. 3(b). Compared with HM Pt/CB catalyst, Pt/RGO shows a lower current density at 0.9 V, indicating that the kinetic current is lower when Pt NCs are loaded on RGO. In addition, the diffusion-limiting potential region (where current is stabilized as a plateau) is shorter for the Pt/RGO catalyst, meaning that its kinetic current drops faster with elevating potential. However, for the HM Pt/CB catalyst, the current at mixed kinetic-diffusion control region (between about 0.80 and about 0.95 V) is higher than the commercial catalyst. These results indicate that the RGO-supported Pt NCs show lower ORR activity than on CB, and pure RGO inhibits the oxygen reduction rate. Without wishing to be bound by a particular theory, this inhibition can be partly due to the tendency of RGO sheets to form a closely-packed film when the Pt/RGO catalyst was dried, which inhibits the diffusion of $O_2$ through the film to approach the Pt surface and thus lowers the reduction rate on Pt NCs. The stacking of the Pt-loaded RGO can be directly observed through scanning electron microscope ("SEM") images shown in FIG. 8(c,d). Interestingly, when CB is inserted between Pt-loaded RGO sheets as a secondary support, currents can be dramatically enhanced between about 0.6 and about 0.9 V, indicating that the ORR activity can be recovered. Without wishing to be bound by a particular theory, this enhancement can result from enlarged gaps between RGO sheets, which provide enough space for oxygen diffusion through the film, enhance the oxygen supply in the film, and accelerate the reduction rate, as confirmed with SEM images shown in FIG. 8(e,f). Comparing the polarization curves of Pt/RGO/CB-1 and Pt/RGO/CB-2 samples, it can be observed that, when more CB is added, the ORR activity can be further enhanced, confirming the proposed inhibition mechanism of RGO and the recovering mechanism by adding CB.

Figure 4:
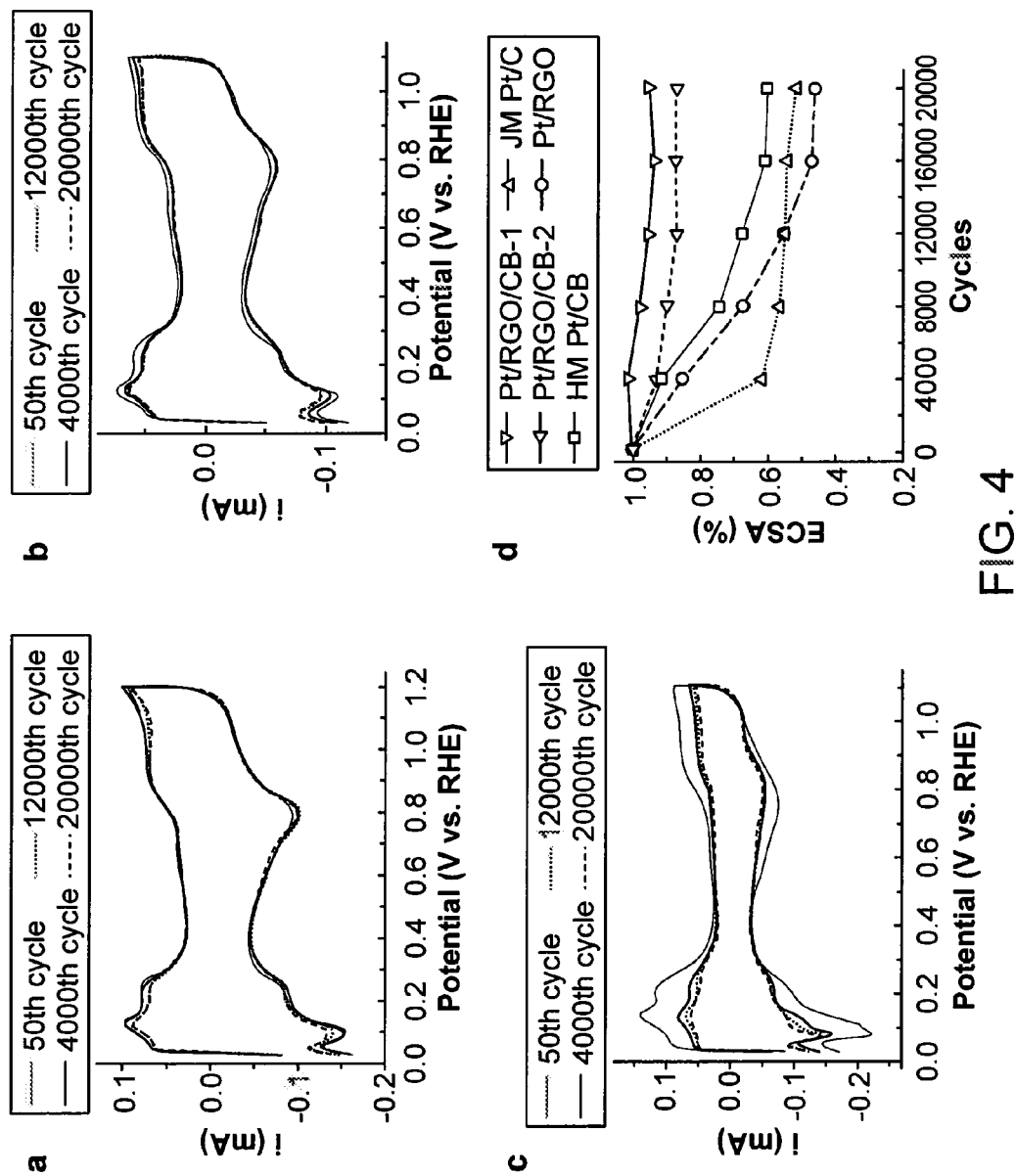
FIG. 4: CV curves after 50, 4,000, 12,000, and 20,000 cycles for (a) Pt/RGO/CB-1, (b) Pt/RGO/CB-2, and (c) JM Pt/C. (d) Comparison of electrochemical surface area ("ECSA") loss for different catalysts.
Figure 9:
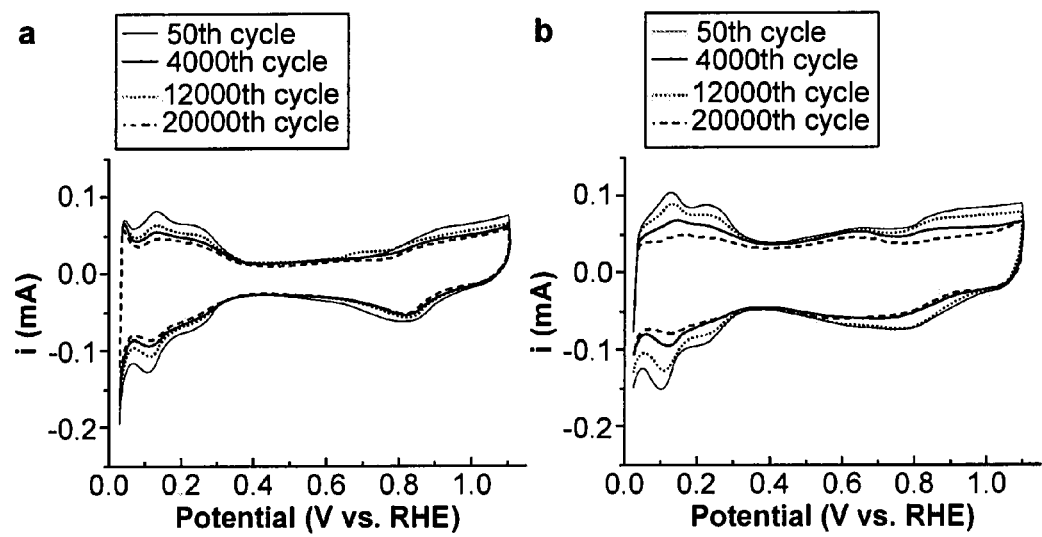
FIG. 9: CV curves after 50, 4,000, 12,000, and 20,000 cycles for (a) custom-made HM Pt/CB and (b) Pt/RGO.

ADT was carried out to test the durability of the catalysts. Potential was cycled between about 0.6 and about 1.1 V in about 0.1 M $HClO_4$, which was exposed to the atmosphere. CV curves between about 0 and about 1.1 V were recorded every 4,000 cycles in order to compare the change of ECSAs during the potential cycling. FIGS. 4(a) and (b) show the evolution of CV curves for Pt/RGO/CB-1 and Pt/RGO/CB-2, with the change of JM Pt/C shown in FIG. 4(c) as a comparison. The corresponding curves for HM Pt/CB and Pt/RGO are shown in FIG. 9. It can be observed from FIG. 4(d) that the ECSA of JM Pt/C drops to almost 60% of its initial surface area after the first 4,000 ADT cycles, but the loss slows down, and the final ECSA after 20,000 cycles stabilizes at about 51% of the initial value, consistent with previously reported results. For the HM Pt/CB catalyst, the ECSA slowly drops to about 60%, slightly better than the commercial catalyst. The Pt/RGO catalyst retains about 46% of its initial surface area. However, the Pt/RGO/CB-2 sample shows improvement of ECSA loss, with about 87% of the initial ECSA remaining With a higher amount of CB addition, the Pt/RGO/CB-1 sample retains more than about 95% of its initial ECSA.

Figure 5:
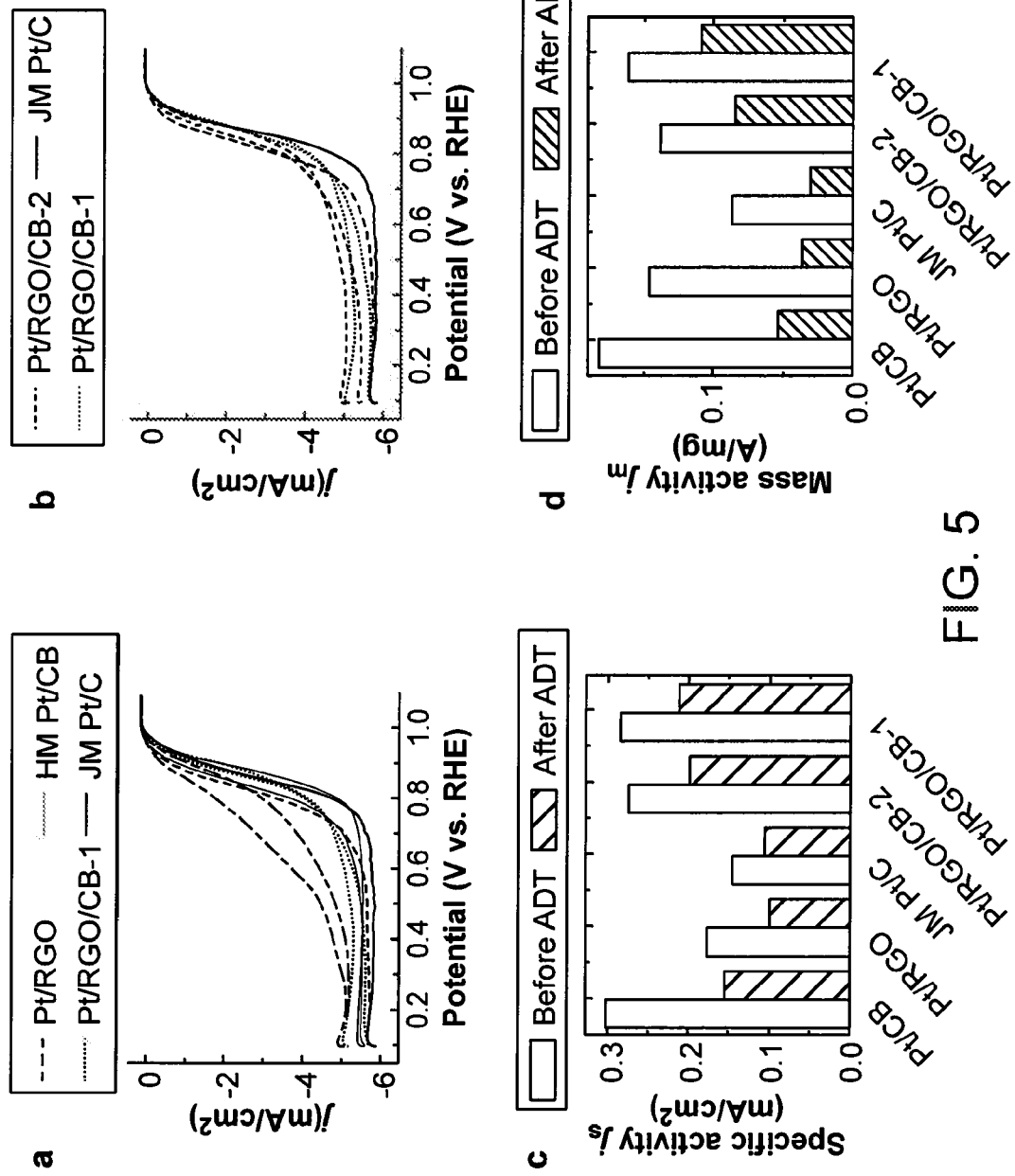
FIG. 5: (a) Polarization curves of HM Pt/CB, Pt/RGO, JM Pt/C, and Pt/RGO/CB-1 before (solid curve) and after (dashed curve) accelerated durability test ("ADT"). (b) Polarization curves of Pt/RGO/CB-1 and Pt/RGO/CB-2 with comparison of JM Pt/C before (solid) and after (dashed) the ADT. (c) and (d) show specific activities and mass activities at 0.9 V for different catalysts.

ORR activities after 20,000 cycles of ADT were also measured for all samples in $O_2$-saturated $HClO_4$ electrolyte. FIG. 5(a) shows the polarizations curves for HM Pt/CB, Pt/RGO, Pt/RGO/CB-1, and JM Pt/C catalysts. As comparisons, polarization curves before the ADT are shown in solid curves, and after the ADT are shown in dashed curves. It can be observed that the activities of single-type-carbon supported Pt NCs show greater current drop after the ADT, while there is almost no change on the polarization curve of the Pt/RGO/CB-1 sample in the mixed kinetic-diffusion control region. To illustrate the effect of CB amount added into the Pt/RGO catalyst, FIG. 5(b) shows the comparisons of Pt/RGO/CB-1 and Pt/RGO/CB-2 with JM Pt/C, indicating the superior performance of Pt/RGO/CB-1 and Pt/RGO/CB-2 over the commercial catalyst. Activities were calculated as a quantitative comparison to illustrate the superior performance of Pt/RGO/CB catalysts. Mass-transport-corrected kinetic current at 0.9 V was calculated according to the Levich-Koutecký equation: $1/i=1/i_k+1/i_d$, where $i_k$ is the kinetic current, and $i_d$ is the diffusion-limiting current. Specific activities were calculated by dividing the kinetic current by ECSAs determined from corresponding CV curves. As shown in FIG. 5(c), after the ADT, the specific activities of Pt/RGO/CB-1 and Pt/RGO/CB-2 samples at 0.9 V are about 0.212 and about 0.200 mA/$cm^2$ respectively, almost twice that of commercial JM Pt/C catalyst, and higher than those supported on CB or RGO alone. In terms of mass activity, the Pt/RGO/CB-1 sample retains at about 0.109 A/mg after ADT, slightly higher than the activity of the Pt/RGO/CB-2 sample, and almost triples the final mass activity of the commercial JM Pt/C after ADT. Both Pt/RGO/CB samples show significantly smaller change in activities than that of the commercial catalyst, indicating the enhancement effect on catalyst durability when inserting CB into Pt/RGO.

Figure 6:
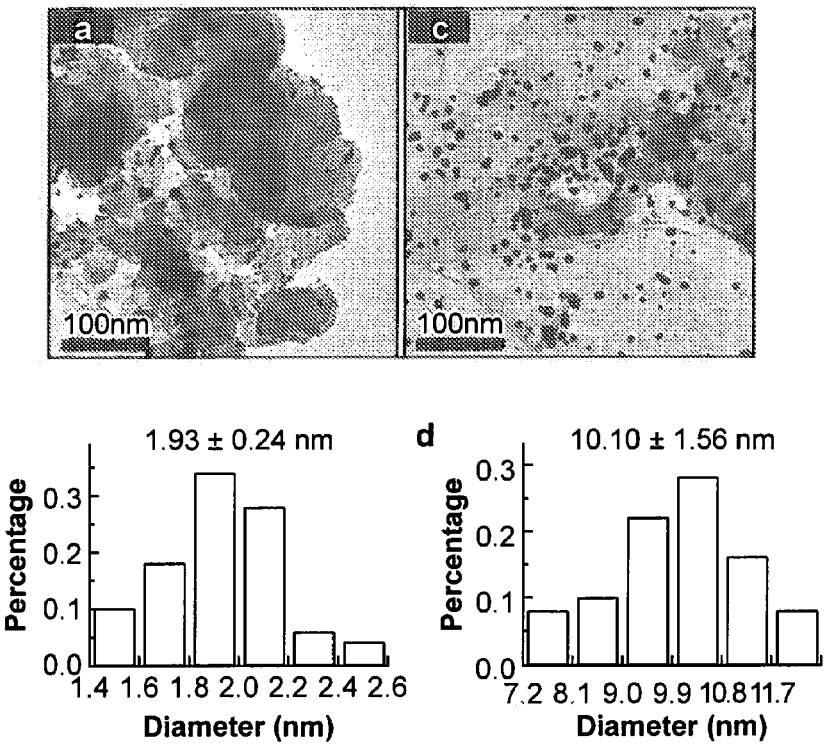
FIG. 6: (a) TEM image of Pt particles supported on CB in collected Pt/RGO/CB from an electrode after ADT. (b) Statistical analysis of Pt particle size supported on CB. (c) TEM image of Pt supported on RGO in collected Pt/RGO/CB from the electrode after ADT. (d) Statistical analysis of Pt particle size supported on RGO.
Figure 10:
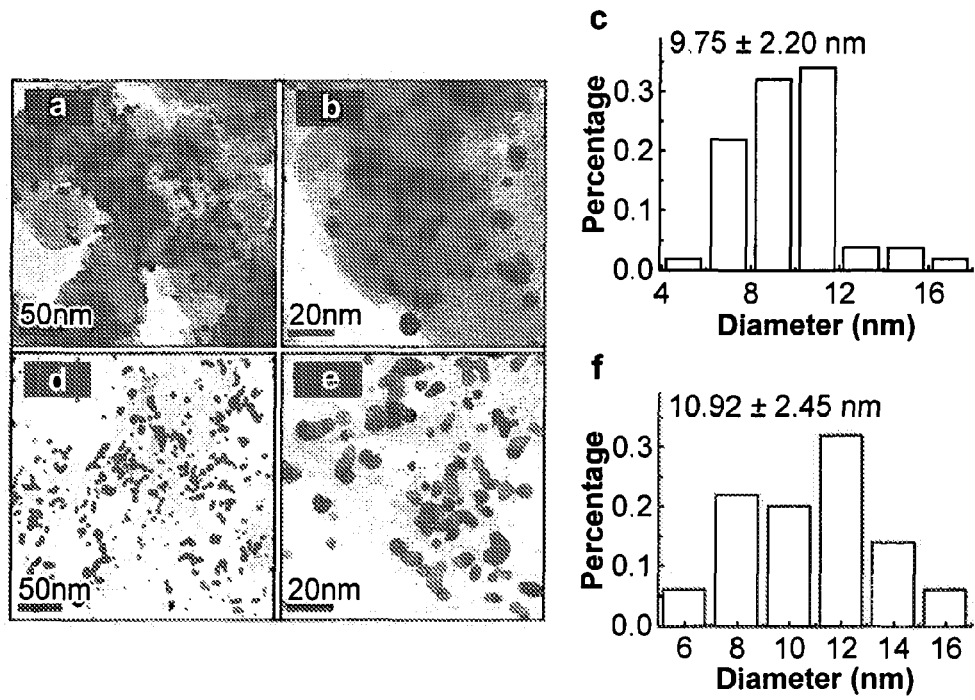
FIG. 10: (a,b) TEM images and (c) histogram of statistical analysis of Pt particle size (based on 100 randomly picked particles) of Pt/CB collected from an electrode after ADT.

To reveal the mechanism of the enhancement, catalysts were collected by sonicating the GCE in isopropanol after the ADT, and their structures were observed by TEM. FIG. 10(a,b) and (d,e) show the TEM images of as-prepared HM Pt/CB and Pt/RGO, and FIG. 10(c,f) show the statistical analysis of the Pt NC size. The NCs grow in size through Ostwald ripening. The average size is about 9.75 nm for HM Pt/CB, and about 10.92 nm for Pt/RGO, both with wider size distributions. Pt in the commercial JM Pt/C catalyst grows in size from about 3 nm to about 12 nm after the ADT as shown in FIG. 11. However, in Pt/RGO/CB samples, after the ADT, a significant portion of Pt is attached onto CB, and the size of NCs attached on CB is noticeably smaller than that on RGO sheets, as shown in FIG. 6. The statistical analysis shows that the average size of NCs attached on CB is about 1.93 nm, much smaller than the initial Pt NCs loaded on RGO sheets. These results can be explained by the re-capture of Pt atoms or tiny Pt clusters, generated from dissolution of Pt NCs occurring on RGO sheets, by the CB. The migration of Pt atoms or clusters on carbon surface can depend on surface heterogeneity, which means that defects or kinks on the surface can serve as heterogeneous nucleation sites. Compared with a relatively smooth graphitized surface, CB is richer in kinks and traps, which provide more nucleation sites for migrating Pt species (atoms or clusters) and re-collect more Pt species that would otherwise combine into larger particles or dissolve into an electrolyte. In such manner, CB is capable of retaining more ECSA. This is consistent with the results that the loss of Pt ECSA is lower on CB than on RGO in the case of single-type-carbon support. For the Pt/RGO/CB composite, on one hand, the CB can capture the migrating Pt species generated from dissolution of Pt NCs on RGO. On the other hand, the close contact between CB and RGO sheets (due to π-π interactions) can slow down or trap the migrating Pt species, which then nucleate as ultra-small NCs and stabilize on CB surface. In this way, the newly generated surface area by the ultra-small Pt NCs partly offsets the decreased Pt surface area due to the dissolution of Pt on RGO as well as ripening, and, to a large extent, compensates for the total loss of ECSA. This is also consistent with the change of diffusion-limiting current behavior observed in polarization curves after ADT for Pt/RGO/CB samples. It can be observed from FIG. 5(b) that the diffusion-limiting currents of the Pt/RGO/CB samples are approaching those of the CB supported catalysts after ADT, meaning that substantial amounts of Pt are re-located from the RGO onto the CB, resulting in slightly higher diffusion-limiting current. With this proposed mechanism, the high durability of the Pt/RGO/CB samples can be understood. The proposed mechanism also can be confirmed by another type of catalyst designed by mixing JM Pt/C catalyst with RGO (termed as JM Pt/C/RGO). With good mixing between the JM Pt/C catalyst and the RGO, the final ECSA of JM Pt/C/RGO after 20,000 cycles of ADT can be retained over about 80% (as shown in FIG. 12) of the initial ECSA, much higher than that of the JM Pt/C catalyst (about 51%). This result confirms that the close contact between CB particles and RGO can stabilize the Pt NCs and weaken the ripening and loss of Pt.

By way of summary, Pt NCs are synthesized and loaded on RGO with substantially uniform distribution, and CB is inserted between the Pt-loaded RGO sheets as a secondary support. Pt/RGO/CB shows dramatically enhanced ORR activity compared with Pt/RGO in 0.1 M $HClO_4$. With the increase of CB ratio in Pt/RGO/CB catalyst, the ORR activity is also increased. The durability of the catalysts was measured by ADT for up to 20,000 cycles. The Pt/RGO/CB catalyst shows the lowest loss of ECSA after the ADT. Specifically, the Pt/RGO/CB-1 sample shows less than about 5% loss in ECSA, compared with the commercial catalyst that lost almost 50% after the same number of cycling. The ORR mass activity of the Pt/RGO/CB catalyst after the ADT can be about 2 times higher than that of the commercial catalyst. TEM observations revealed that the CB inserted into the RGO sheets can re-capture ultra-small Pt NCs generated by Ostwald ripening, and can stabilize these NCs with the aid of strong interaction between CB and RGO. This catalyst design approach can be used to prepare high performance and durable fuel cell catalysts.

Method:

Preparation of Pt NCs

The Pt NCs were synthesized according with the following protocol. About 20 mL of a precursor solution was prepared with final concentrations of $H_2PtCl_6$ at about 1.5 mM, sodium citrate (as a reducing agent) at about 0.5 mM, and water-soluble 1,3,5-trihydroxybenzene (as a surfactant) at about 1 mg/mL in ultra-pure water (18 MΩ, Millipore). The precursor solution was then heated to about 85° C. within about 10 minutes and maintained at about 85° C. for about 5 minutes before the reaction. A fresh stock solution of about 120 mM $NaBH_4$ (as a reducing agent) was prepared, and about 0.5 mL of the $NaBH_4$ solution was injected into the precursor solution. The reaction solution was kept being stirred at about 85° C. for about 1 hour. The reaction solution was cooled to room temperature. The weight concentration of the Pt NCs in solution was estimated with ICP-OES. About 1 mL of the reaction solution was taken out and centrifuged at about 10,000 rpm. Supernatant was disposed, and the Pt NCs were collected for ICP-OES measurement. The ICP results can be used to estimate the weight concentration of Pt NCs in the reaction solution.

Preparation of Catalyst

About 10 mL of isopropanol ("IPA") was mixed with about 10 mL of the pristine Pt NCs solution. The mixed solution was sonicated for about 5 minutes. To prepare the Pt/RGO catalyst (weight ratio Pt:RGO of about 1:2), an expected amount of RGO sample was dissolved, sonicated, and dispersed well in about 5 mL of IPA. The Pt NC solution and the RGO solution were then mixed and sonicated for about 30 minutes in ice water bath. The catalyst solution was stirred overnight, centrifuged at about 8,000 rpm to collect the catalyst, and then washed with water for 2 times, acetone for 2 times, and then IPA for 2 times. For custom-made HM Pt/CB catalyst, procedures were the same except that the weight ratio Pt:CB is about 1:4. The final loading of Pt on carbon (weight ratio) is determined by TGA. The catalyst powders, obtained by freeze drying, were heated from about 50° C. to 600° C. at the rate of about 10° C./minute in air.

To prepare the Pt/RGO/CB catalyst, pre-prepared Pt/RGO catalyst was mixed with CB solution (dissolved in IPA). Proper amount of CB was used to achieve Pt/RGO/CB with different RGO/CB weight ratios. In this example, RGO/CB with weight ratios of about 1/1 (termed as Pt/RGO/CB-1) and about 2/1 (termed as Pt/RGO/CB-2) were prepared and compared.

To prepare the JM Pt/C/RGO catalyst, about 10 mg of JM Pt/C catalyst was dissolved in about 4 mL of $H_2O$/IPA (4/1) mixed solvent. The solution was sonicated for about 30 minutes, for the following procedure as a JM Pt/C stock solution. RGO solution (about 1 mg/mL in IPA) containing about 8 mg RGO, and about 0.5 mL of about 20 mM sodium chloride solution (in $H_2O$) were added into the JM Pt/C stock solution. The mixed solution was sonicated for about 30 minutes, and then stirred overnight. The JM Pt/C/RGO catalyst was centrifuged, washed with IPA for 3 times, and re-dispersed in about 10 mL IPA for further use.

Electrochemical Measurement

According to the Pt weight concentrations determined by ICP-OES, all catalyst solutions (in IPA) were diluted to the same Pt concentration of about 0.3 mg/mL. About 1 µL 5% Nafion solution was added into about 100 µL catalyst solution, and the solution was sonicated for about 10 minutes. About 9 µL catalyst solution was drop-casted on GCE (Pine Instrumentation) with electrode area of about 0.196 $cm^2$ and dried in vacuum. The final Pt loading of all custom-made catalysts was about 13.8 µg/$cm^2$. Commercial JM Pt/C catalyst (20 wt % Pt on Vulcan carbon) purchased from Johnson Matthey was used as the baseline catalyst for comparison. The same procedure as described above was used for JM Pt/C except that the final Pt loading was about 20.4 µg/$cm^2$. The resulting catalyst film was checked with optical microscopy to confirm that it is uniform. Ag/AgCl (about 3 M CY) was used as a reference electrode, and Pt wire was used as a counter electrode. All electrochemical data were captured in about 0.1 M $HClO_4$ electrolyte. ECSA was calculated by integrating the hydrogen adsorption charges in CV. The ADTs were scanned between about 0.6 and about 1.1 V (referenced to RHE) in electrolyte exposed to atmosphere up to 20,000 cycles, and CV curves were recorded every 4,000 cycles.

Results:

TEM and high resolution TEM characterization of as-synthesized Pt NCs

FIG. 7(a) shows a TEM image of as-synthesized Pt NCs, and the inset shows statistical analysis of sizes based on 100 randomly picked NCs. FIG. 7(b) shows a high resolution TEM image showing the lattice of a Pt NC, and the inset shows a Fast Fourier transform from the <110> zone axis. FIG. 7(c) shows a schematic of a constructed cuboctahedral NC with (100) and (111) facets highlighted.

SEM images of catalyst films

Figure 8:
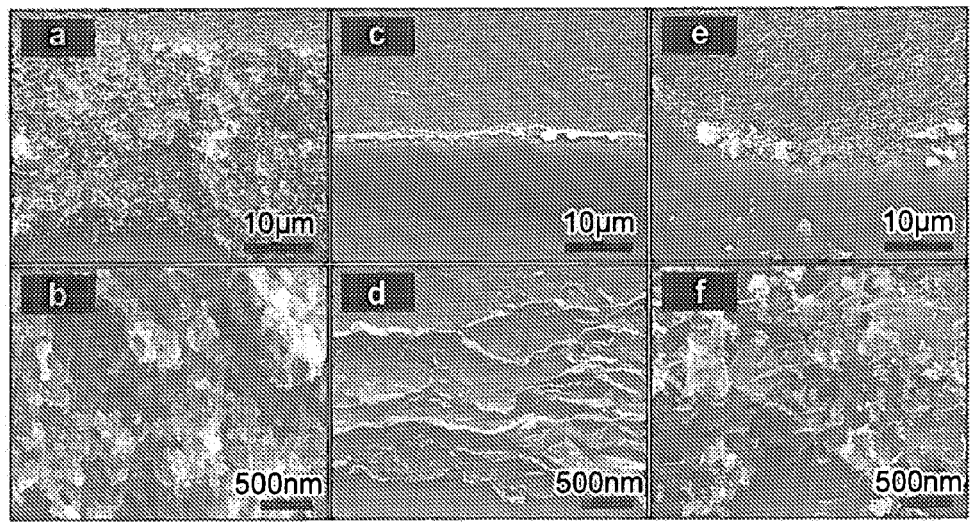
FIG. 8: (a,b), (c,d), and (e,f) are scanning electron microscope ("SEM") images of custom-made HM Pt/CB, Pt/RGO, and Pt/RGO/CB-1 catalyst films. Catalyst films were made by drop-casting catalyst solution on $SiO_2$.

FIGS. 8(a,b), (c,d), and (e,f) are SEM images of custom-made HM Pt/CB, Pt/RGO, and Pt/RGO/CB-1 catalyst films. Catalyst films were made by drop-casting catalyst solution on $SiO_2$.

ADT Measurement

Evolutions of CV curves for custom-made HM Pt/CB and Pt/RGO were measured in about 0.1 M $HClO_4$ electrolyte between about 0 and about 1.1 V at the sweep rate of about 100 mV/s (vs. RHE) as comparisons. FIG. 9 shows CV curves after 50, 4,000, 12,000, and 20,000 cycles for (a) custom-made HM Pt/CB and (b) Pt/RGO.

Mechanism Study

TEM images of custom-made HM Pt/CB and Pt/RGO samples collected from GCE after ADT are shown in FIG. 10. Statistical analysis on particle size was carried out based on counting the sizes of 100 randomly picked particles, for both catalysts.

To understand the mechanism of the enhancement of durability, TEM images of the JM Pt/C catalyst were taken before and after the ADT as a comparison, as shown in FIG. 11. Statistical analysis on particle size was carried out based on counting the sizes of 100 randomly picked particles.

To confirm the proposed mechanism for the enhanced durability of Pt/RGO/CB, ADT was carried out for JM Pt/C/RGO catalyst, as shown in FIG. 12.

While the invention has been described with reference to the specific embodiments thereof, it should be understood by those skilled in the art that various changes may be made and equivalents may be substituted without departing from the true spirit and scope of the invention as defined by the appended claims. In addition, many modifications may be made to adapt a particular situation, material, composition of matter, method, operation or operations, to the objective, spirit and scope of the invention. All such modifications are intended to be within the scope of the claims appended hereto. In particular, while certain methods may have been described with reference to particular operations performed in a particular order, it will be understood that these operations may be combined, sub-divided, or re-ordered to form an equivalent method without departing from the teachings of the invention. Accordingly, unless specifically indicated herein, the order and grouping of the operations is not a limitation of the invention.

What is claimed is:

1. A fuel cell, comprising:
   an anode;
   a cathode; and
   an electrolyte disposed between the anode and the cathode,
   wherein at least one of the anode or the cathode includes a hybrid support and an electro-catalyst dispersed on the hybrid support, the hybrid support includes a first, carbon-based support and a second support different from the first, carbon-based support, the first, carbon-based support includes sheets of reduced graphene oxide, the second support includes particles that are disposed between the sheets of reduced graphene oxide, and a weight percentage of the second support is at least 10% relative to a combined weight of the first, carbon-based support and the second support.

2. The fuel cell of claim 1, wherein the second support includes carbon black particles.

3. The fuel cell of claim 1, wherein the weight percentage of the second support is at least 30% relative to the combined weight of the first, carbon-based support and the second support.

4. The fuel cell of claim 1, wherein the electro-catalyst includes precious metal nanocrystals.

5. The fuel cell of claim 1, wherein a weight percentage of the electro-catalyst is in the range of 15% to 45%, relative to a combined weight of the electro-catalyst and the hybrid support.

6. The fuel cell of claim 1, wherein the at least one of the anode or the cathode has a specific activity that is at least 0.18 mA/cm$^2$.

7. The fuel cell of claim 1, wherein, after 20,000 cycles, the at least one of the anode or the cathode retains at least 75% of an initial electrochemical surface area.

8. An electrode for a fuel cell, comprising:
   a hybrid support; and
   an electro-catalyst dispersed on the hybrid support,
   wherein the hybrid support includes a primary support of reduced graphene oxide and a secondary support of a carbon-based material different from reduced graphene oxide, and a weight ratio of the secondary support to the primary support is in the range of 3:7 to 7:3.

9. The electrode of claim 8, wherein the carbon-based material is selected from carbon black, carbon nanotubes, and pyrolytic graphite.

10. The electrode of claim 8, wherein the electro-catalyst is dispersed on the hybrid support as nanocrystals, and at least a majority by number of the nanocrystals are attached on the primary support.

11. The electrode of claim 8, wherein the weight ratio of the secondary support to the primary support is in the range of 2:3 to 3:2.

12. The electrode of claim 8, wherein the electrode has a mass activity that is at least 0.1 A/mg.

13. The electrode of claim 8, wherein the electrode has a specific electrochemical surface area that is at least 48 m$^2$/g.

14. A manufacturing method of an electrode for a fuel cell, comprising:
   combining an electro-catalyst with a primary support to form an electro-catalyst-loaded primary support; and
   combining the electro-catalyst-loaded primary support with a secondary support to form a composite of the electro-catalyst, the primary support, and the secondary support,
   wherein one of the primary support and the secondary support includes reduced graphene oxide, and another one of the primary support and the secondary support includes a support material different from reduced graphene oxide and selected from carbon black, carbon nanotubes, and pyrolytic graphite.

15. The manufacturing method of claim 14, wherein a weight ratio of the secondary support to the primary support is in the range of 3:7 to 7:3.

* * * * *